United States Patent [19]

Armando

[11] Patent Number: 5,257,883
[45] Date of Patent: Nov. 2, 1993

[54] OPERATING HEAD FOR AUTOMATIC MACHINE TOOLS

[75] Inventor: Corsi Armando, Piacenza, Italy
[73] Assignee: Jobs S.p.A., Piacenza, Italy
[21] Appl. No.: 977,236
[22] Filed: Nov. 16, 1992

[30] Foreign Application Priority Data

Jul. 22, 1992 [IT] Italy .................. PC92 A 000011

[51] Int. Cl.⁵ .................................. B23C 1/12
[52] U.S. Cl. ......................... 409/201; 409/211; 409/216
[58] Field of Search ............... 29/39, 26 A; 409/201, 409/209, 212, 211, 216, 215; 74/479 B

[56] References Cited

U.S. PATENT DOCUMENTS

| | | | |
|---|---|---|---|
| 4,370,080 | 1/1983 | Goode | 409/216 X |
| 4,378,621 | 4/1983 | Babel | 29/26 A |
| 4,614,468 | 9/1986 | Waldrich et al. | 409/211 |
| 4,683,772 | 8/1987 | Colimitra | 74/479 B |
| 4,904,131 | 2/1990 | Affaticati | 409/216 |
| 5,014,542 | 5/1991 | Corsi | 409/201 X |

FOREIGN PATENT DOCUMENTS

| | | | |
|---|---|---|---|
| 2102405 | 4/1972 | France | 409/211 |
| 222809 | 9/1989 | Japan | 409/211 |
| 673387 | 7/1979 | U.S.S.R. | 409/216 |

*Primary Examiner*—William Briggs
*Attorney, Agent, or Firm*—Notaro & Michalos

[57] ABSTRACT

An operating head for automatic machine tools consists of a fork (2) having a shaft (6) rotatably mounted to a support arm (1) for rotating around an axis (C). A motor chuck (5) is rotatably mounted between the arms of the fork and rotates around an axis (A). Axis (A) is orthogonal to axis (C). Drive systems (10,9,8) control the rotation of the fork (2) around the axis (C) by directly engaging the shaft (6). In order to transmit rotational motion for the fork (2) around support arm (1) and for the positioning motion of the motor chuck (5), a hypoid toothed crown wheel (8,13) and pinion (9,14) are used.

10 Claims, 3 Drawing Sheets

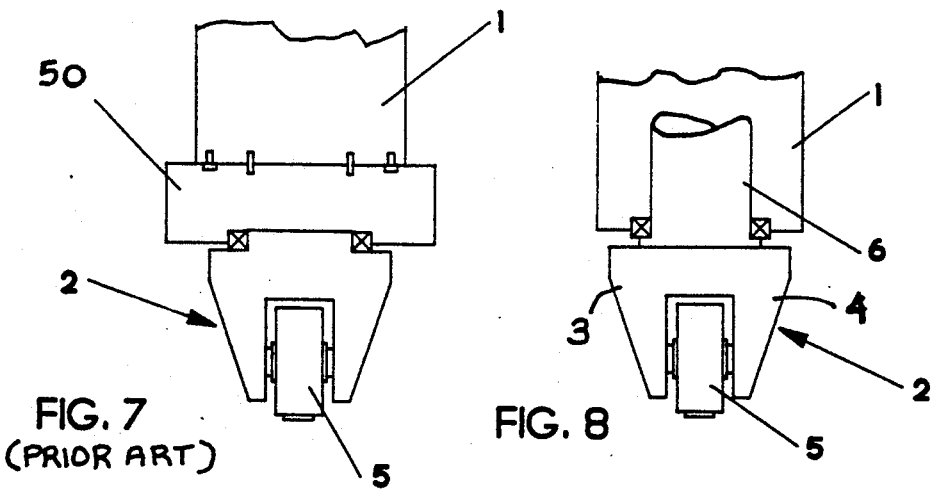
FIG. 7 (PRIOR ART)
FIG. 8
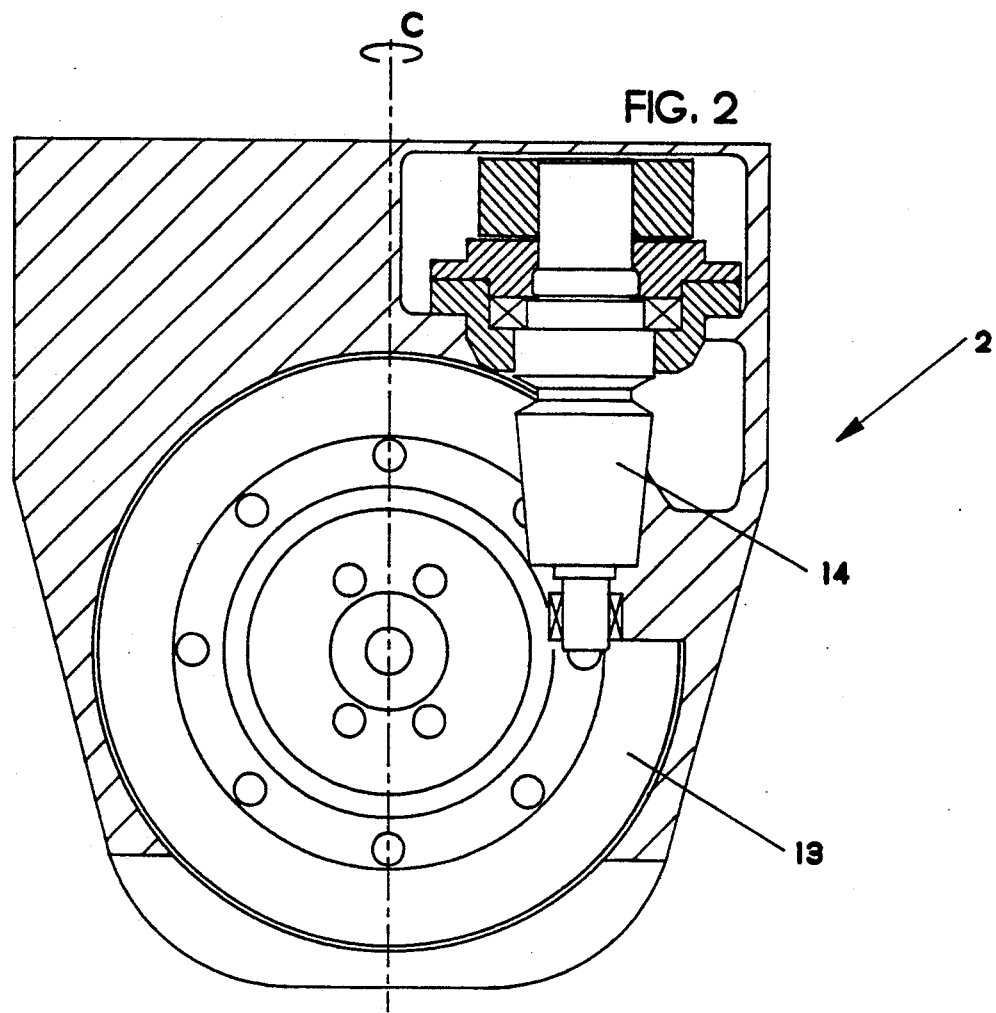
FIG. 2

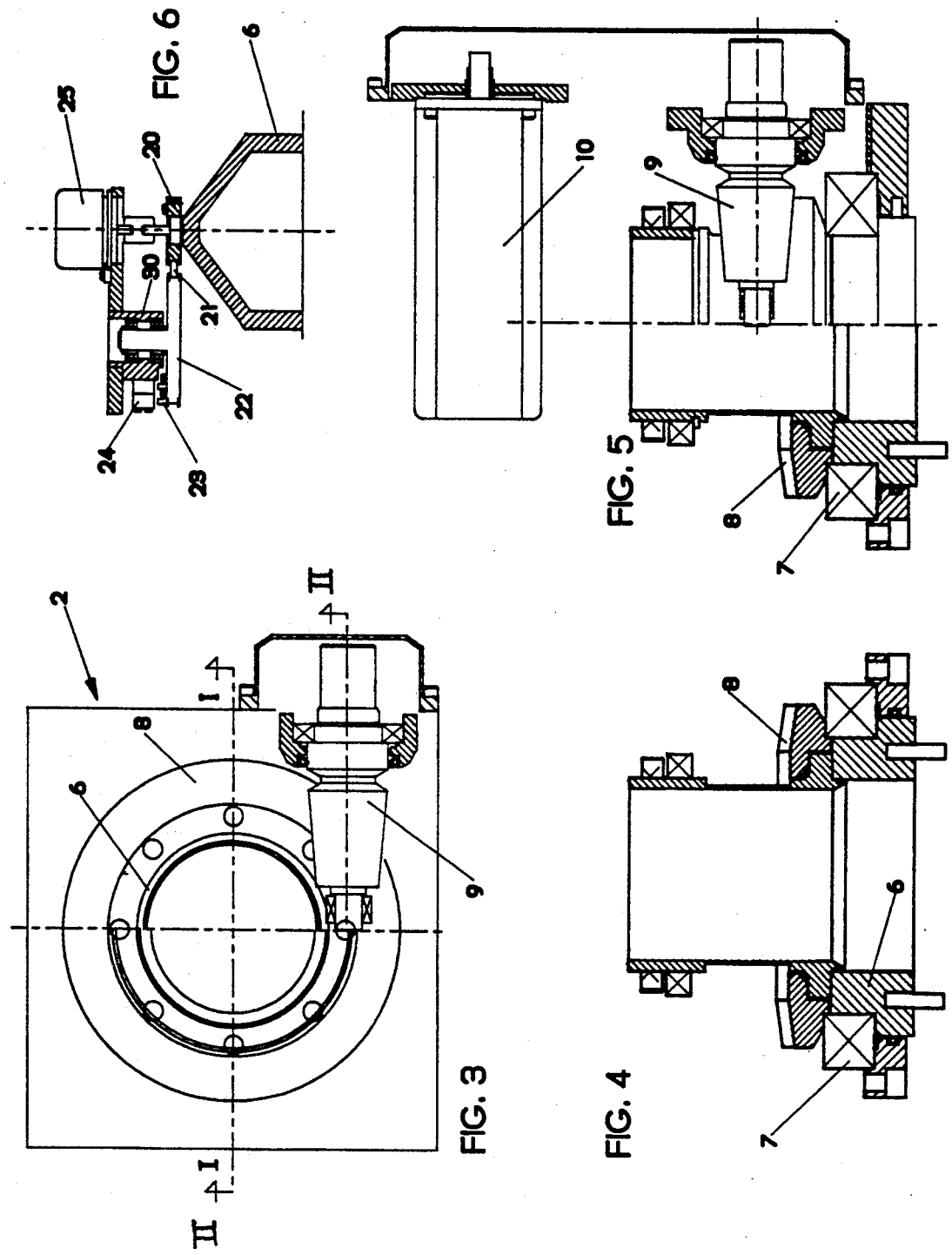

OPERATING HEAD FOR AUTOMATIC MACHINE TOOLS

FIELD AND BACKGROUND OF THE INVENTION

This invention relates to an operating head for automatic machine tools which uses bevel gear pairs with hypoid crown wheel and pinion to transmit the chuck positioning motion.

In particular, the invention relates to operating heads of the type comprising a fork fitted to a support with several degrees of freedom and a motor chuck, hinged to the fork, which can be revolved and positioned along one or more axes in relation to the fork.

The purpose of the invention is to obtain an operating head of the type indicated above which, though equipped with a high-power motor chuck (5–7 KW), is also very compact, so that work can be performed inside hollow objects if required, and any play due to assembly tolerances and to wear of the parts can be eliminated, and sufficient rigidity is produced to enable the machine to withstand the stresses transmitted by the tool during machining without buckling.

A further purpose of the invention is to obtain an operating head in which, in order to improve the rigidity characteristics of the machine, the head "pivot point" projects less in relation to the chuck connection plane.

Another purpose of the invention is to produce an operating head which is simpler to assemble than the ones currently used.

These purposes are achieved with an operating head in accordance with the characterising part of the claims. Various types of operating head are already known which comprise a fork, fitted to a support with several degrees of freedom, which is equipped with a motor chuck.

For example, U.S. Pat. No. 4,904,131 describes an operating head which presents the general structure described above, in which the chuck positioning motion (axis A) is transmitted from a motor located in the fork support arm to the electric chuck via an inclined shaft with bevel gears at the ends which engage corresponding cogwheels, one built into the fork support arm and the other into the chuck support.

This system produces a very compact head. German patent application no. 3.809.750 also describes an operating head in which the chuck positioning motion is transmitted via a set of bevel gears subject to an axial elastic force, in order to eliminate play due to wear. This system, however, is quite complex and too bulky.

An operating head of the type with fork and electric chuck is also described in Italian Pat. No. 1.220.733, which illustrates a machine tool comprising an arm that moves along three cartesian axes; a fork fitted to the end of the arm can rotate around the arm axis and is equipped with a motor chuck presenting three degrees of freedom in relation to the fork.

These automatic machines are used to perform precision tasks such as milling, contouring, countersinking and other jobs involving the removal of material and assembly work, especially in the aeronautical industry.

SUMMARY OF THE INVENTION

The present invention also falls into this category; it is designed to further improve this type of equipment by offering a head which simultaneously presents all the above-mentioned advantages of compactnesss, rigidity and elimination of play.

BRIEF DESCRIPTION OF THE DRAWINGS

This invention will now be described in detail, by way of example but not of limitation, by reference to the annexed drawings in which:

FIG. 2 is a view in cross-section of the fork shown in FIG. 1, along a plane orthogonal to the preceding plane;

FIG. 3 is a top view of the fork showing in cross-section the systems which control its rotation around the support arm axis;

FIG. 4 is a view in cross-section taken along line I—I shown in FIG. 3;

FIG. 5 is a view in cross-section taken along line II—II shown in FIG. 3;

FIG. 6 illustrates a view in cross-section of the systems which control the fork rotation;

FIGS 7 and 8 schematically illustrate an operating head in accordance with a known technique and an operating head in accordance with the invention.

DESCRIPTION OF THE PREFERRED EMBODIMENT

Figure 1:
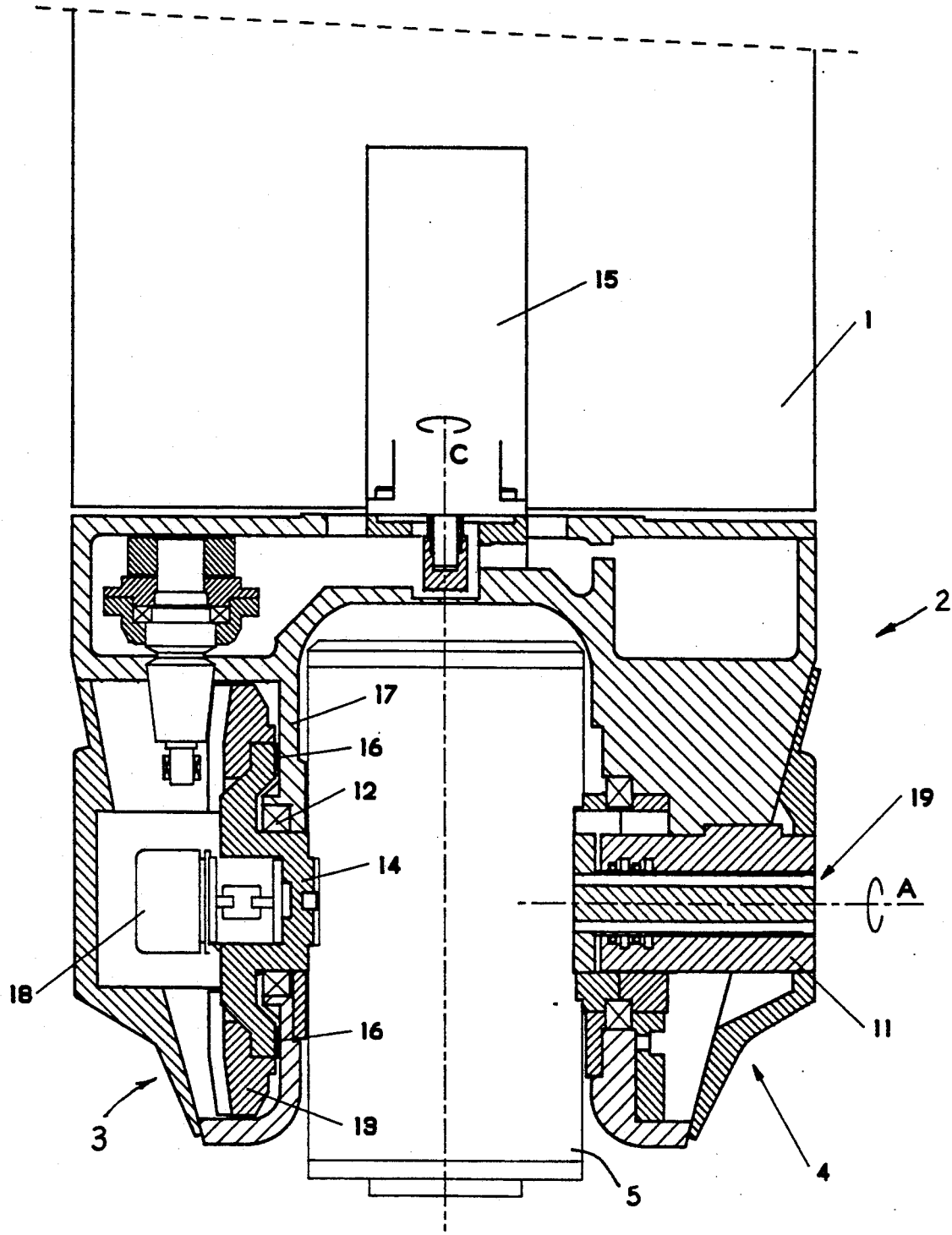
FIG. 1 is a view in cross-section of an operating head in accordance with the invention along a plane passing through the fork arms, and also showing the lower part of the support arm at the point where the fork is connected to it.

In FIGS. 1, 2, and 8, 1 indicates a support arm of the operating head, the body of which, indicated at 2, basically consists of a fork 2 with a motor chuck 5 fitted between fork 2 arms 3 and 4. Fork 2 is fitted to arm or sleeve 1 via a hollow shaft 6, built into the fork, whose axis coincides with the axis of arm 1.

FIG. 1 shows hollow shaft 6, together with the fork 2, which can rotate around the axis of arm 1 (axis C), while the motor chuck 5 can rotate around an axis (axis A) which passes through the fork arms 3 and 4 and which is orthogonal to axis C. Both these movements are numerically controlled in a known way, and serve to position and revolve the chuck 5 and a tool.

As shown in FIGS. 1, 4 and 5, shaft 6 of fork 2 is fitted to arm 1 on bearings 7 (FIG. 4); a crown wheel with hypoid toothing 8, is fixed to the shaft 6, and engages a corresponding bevel pinion 9, and activated by a motor 10, which can be pushed axially by Belleville washers or the like to press against the crown wheel toothing 8, in order to eliminate any play due to wear on the parts.

Both motor 10 and the linkage constituted by crown wheel 8 and pinion 9 are housed inside arm 1.

This configuration eliminates the need to use a reducer, (axis C) which is employed in known heads in order to attach the fork 2 to the sleeve 1 (FIG. 1).

In order to appreciate this difference fully, reference should be made to FIGS. 7 and 8.

As can be seen from FIG. 7, in known heads, fork 2 having an electric chuck 5 is fitted to a reducer 50, which in turn is fitted to sleeve 1.

This configuration means that the axis of reducer 50 must be aligned with the axis of sleeve 1, and after the fork 2 is installed. After the fork 2 has been fitted, the electric chuck axis is aligned with the sleeve 1 and the axis of the reducer.

In accordance with the invention, the axis of motor chuck 5 can be aligned with the fork axis during bench assembly and then, when the fork 2 has been fitted to the sleeve 1, its axis is aligned with the sleeve axis by adjusting the locking screws used to attach hollow shaft 6 to the fork.

In this way assembly is simplified, because one regulation operation is eliminated and the chuck 5 can be aligned on the workbench.

In addition, the elimination of reducer 50 (FIG. 7) allows the fork 1 to be shortened, thus reducing the degree to which the pivot point projects in relation to the point at which the support arm 1 is connected; thereby considerably improving the rigidity characteristics of the unit. As shown in FIGS. 1 and 2, chuck 5 is fitted to fork 2 via a pair of hubs or pins 11 and corresponding bearings 12 (FIG. 1).

A crown wheel 13, also with hypoid toothing, is fitted to one of the arms 3 or 4; this crown wheel 13 engages a bevel pinion 14, activated by a motor 15 housed in the fork support arm 1 and positioned inside hollow shaft 6 (FIG. 1). Via hypoid gear pair, i.e. bevel pinion 14 and crown wheel 13, motor 10 (FIG. 5) activates the rotations of the fork around the axis of arm 1 (axis C), while motor 15 (FIG. 1) activates, via hypoid gear pair 5, the angular movements and/or swivel of the chuck 5 around axis passing through the fork arms 3 and 4, perpendicular to axis C.

The bottom of crown wheel 13, fitted to the support hub 11 of motor chuck 5, should preferably rest on a thrust bearing 16 located between the bottom of the crown wheel 13 and wall 17 of the fork 2.

In this way any bending stresses to which the crown wheel 13 is subject are passed onto the fork structure, which thus helps absorb these stresses and thereby increases the rigidity of the system.

The rotations of the chuck 5 around axis A are detected by an encoder 18 or similar system, while air, lubricants, coolants, etc. are supplied to the motor chuck 5 through a series of pipes (the piping system being shown as reference numeral 19) passing though the chuck support hub 11 in the arm 4 of the fork 2.

In known machines of this type, the fork can rotate around the axis of the support arm through an angle close to 360°, but the extent of its rotation is limited by the presence of one or more cams which activate limit and reset switches.

However, in some cases it would be useful for the fork to rotate through a full 360°, if not slightly more.

For example, this applies to machining performed on the outer surface of patterns, when it is useful for the tool, having machined all round the pattern until it reaches the starting point, to carry on for a period of time in order to ensure the continuity of the machined surface, without leaving grooves or the like at the point where the machining started.

For this purpose, the head in accordance with the invention is fitted with cams, which activate limit switches, not fitted directly to the fork shaft but located on a support connected to the shaft via a suitable reducer.

As shown in FIG. 6, a pulley 20 is fitted to fork shaft 6 coaxial with it; via a belt 21. Pulley 20 drives a corresponding pulley 22 fitted idle on a shaft 30 built into the casing of arm 1 (FIG. 8). The ratio between pulleys 20 and 22 is such that the second pulley rotates at a lower speed than the first. For example, the ratio between pulleys 20 and 22 might be 1:2.

Cams 23, which activate limit and/or reset microswitches 24 built into the structure of fork support arm 1 (FIG. 1), are integral with pulley 22.

Here again, the rotations of the fork arm 1 are detected by an encoder 25.

During operation, the numerical controls of the machine activate motors 10 and 15 (FIGS. 5 and 1) in order to position the tool correctly.

For this purpose, motor 10 rotates the shaft of pinion 9 via a drive of a known type.

This shaft engages with crown wheel 8 built into fork shaft 6, which is thus made to rotate around axis C (FIG. 1). Pinion 9 can be suitably loaded in such a way as to eliminate play due to wear on the parts.

The rotation of shaft 6, and therefore of the fork 2, is transmitted via pulleys 20 and 22 to cams 23 which activate limit switches 24.

The extent of the fork rotations is detected by encoder 25 connected to the numerical control of the machine.

As the number of revolutions of pulley 22 is suitably geared down in relation to those of pulley 20, the fork can rotate through more than 360° before the cams 23 fitted to pulley 22 engage the limit switches 24.

Thus with a ratio of 1:2 between the toothing of pulleys 20 and 22, the fork 2 can be made to rotate through over 400° around axis C (FIG. C).

Moreover, the use of a hypoid gear pair to transmit motion to the fork 2 means that fewer gears are required, thus enabling the projection of the pivot point to be reduced and space to be saved and, without any change in the overall size of the operating head, providing more room for tools, which can therefore be selected from a wider range.

In the same way, the chuck 5 is positioned around axis A by hypoid gear pair 14 and 13 and activated by motor 15 (FIG. 1). In this case the use of a large crown wheel produces greater resistance to the stresses transmitted by the tool, as the arm of the lever (distance between axis A and toothing of crown wheel 13) which transmits these stresses to the remaining mechanisms is larger. The fact that a thrust bearing 16 is positioned between the crown wheel 13 and the fork casing means that these stresses are transmitted to the head structure, which combines with the other devices to make the unit more rigid.

I claim:

1. An operating head for automatic machine tools, the operating head comprising:
    a support arm (1);
    a fork (2) having a shaft (6) and rotatably mounted around a first axis (C) to the support arm (1) at the shaft (6), the fork (2) having a pair of spaced apart arms (3,4);
    a motor chuck (5) rotatably mounted between the arms (3, 4) of the fork (2), the motor chuck (5) being rotatable around a second axis (A), the second axis (A) being orthogonal to the first axis (C);
    motor means (10, 15) for driving the rotation of the fork (2) and the motor chuck (5);
    a first hypoid pinion (9) operatively connected to the motor means (10,15);
    a first hypoid toothed crown wheel (8) fixed to the shaft (6) and engaging the first pinion (9) for affecting the rotation of the fork (2) around the first axis (C);
    a second hypoid pinion (14) operatively connected to the motor means (10,15); and a second hypoid toothed crown wheel (13) fixed to the motor chuck (5) and engaging the second pinion (14) for affecting the rotation of the motor chuck (5) around the second axis (A).

2. The operating head according to claim 1, wherein the motor means (10,15) is housed inside the support arm (1).

3. The operating head according to claim 2, wherein the first crown wheel (8) and the first pinion (9), are housed inside the support arm (1).

4. The operating head according to claim 2, wherein the second crown wheel (13) and the second pinion (14) are housed inside one of the fork arms (3,4).

5. The operating head according to claim 1, including means for controlling the rotation of the fork (2).

6. The operating head according to claim 5, wherein means for controlling the rotation of the fork (2) comprises a first pulley (20) fitted to the shaft (6), a second pulley (22) operatively connected with the first pulley (20), at least one cam (23) connected to the second pulley (22) and at least one limit switch (24) activatedly connected to the cams (23).

7. The operating head according to claim 4, wherein a thrust bearing (16) is connected between the second crown wheel (13) and the fork (2).

8. An operating head for automatic machine tools, the operating head comprising:
    a support arm (1);
    a fork (2) having a shaft (6) and rotatably mounted around a first axis (C) to the support arm (1) at the shaft (6), the fork (2) having a pair of spaced apart arms (3,4);
    a motor chuck (5) rotatably mounted between the arms (3, 4) of the fork (2), the motor chuck (5) being rotatable around a second axis (A), the second (A) being orthogonal to the first axis (C);
    drive means for driving the rotation of the fork (2) around the first axis (C) and the motor chuck (5) around the second axis (A);
    the drive means including a hypoid pinion (14) operatively connected to the motor chuck (5), a crown wheel (13) engaged with the hypoid pinion (14) for affecting the rotation of the motor chuck (5) around the second axis (A), the crown wheel (13) and the hypoid pinion (14) being housed inside one of the fork arms (3,4).

9. The operating head according to claim 8, wherein the drive means further includes a support arm crown wheel (8) fitted to the support shaft (6) of the fork (2) and a support arm hypoid pinion (9) engaged with the support arm crown wheel (8), the pinion (9) and the crown wheel (8) being housed inside the fork support arm (1).

10. The operating head according to claim 8, wherein a thrust bearing (16) is connected between the crown wheel (13) and the fork (2).

* * * * *